(12) United States Patent
Deng et al.

(10) Patent No.: US 11,025,187 B2
(45) Date of Patent: Jun. 1, 2021

(54) METHOD OF GENERATING MOTOR DRIVING SIGNAL, ELECTRONIC DEVICE AND STORAGE MEDIUM

(71) Applicant: AAC Technologies Pte. Ltd., Singapore (SG)

(72) Inventors: Hanlin Deng, Shenzhen (CN); Xiang Lu, Shenzhen (CN); Yajun Zheng, Shenzhen (CN); Xiuyue Wang, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 0 days.

(21) Appl. No.: 16/702,600

(22) Filed: Dec. 4, 2019

(65) Prior Publication Data

US 2020/0212832 A1 Jul. 2, 2020

(30) Foreign Application Priority Data

Dec. 31, 2018 (CN) .......................... 201811655026.4

(51) Int. Cl.
*H02P 23/03* (2006.01)
*H02P 25/032* (2016.01)
*G08B 6/00* (2006.01)

(52) U.S. Cl.
CPC .............. *H02P 25/032* (2016.02); *G08B 6/00* (2013.01)

(58) Field of Classification Search
CPC ........ H02P 25/032; H02P 25/06; H02P 23/00; G08B 6/00
See application file for complete search history.

(56) References Cited

U.S. PATENT DOCUMENTS 6,275,213 B1 * 8/2001 Tremblay ................ G06F 3/011
345/156
7,446,752 B2 * 11/2008 Goldenberg ............ A63F 13/06
345/156

(Continued)

FOREIGN PATENT DOCUMENTS

CN 103793050 A1 5/2014

OTHER PUBLICATIONS

PCT search report dated Jan. 23, 2020 by SIPO in related PCT Patent Application No. PCT/CN2019/113828 (5 Pages).

*Primary Examiner* — Rina I Duda
(74) *Attorney, Agent, or Firm* — W&G Law Group LLP

(57) ABSTRACT

A method of generating motor driving signal includes: obtaining acceleration segment signal for driving motor to start vibrating, constant segment signal for achieving low-frequency vibration tactile effect of the motor, and attenuating segment signal for decreasing vibration quantity of the motor in low frequency manner, frequency of constant segment signal and of attenuating segment signal being smaller than frequency of acceleration segment signal; splicing the acceleration segment signal with the constant segment signal, and reserving idle period with no signal output therebetween to obtain first motor driving signal; adjusting parameter of constant segment signal of first motor driving signal according to vibration feeling requirement, and splicing attenuating segment signal after the adjusted first motor driving signal to obtain second motor driving signal; and adjusting parameter of attenuating segment signal of second motor driving signal, and determining second motor driving signal with highest braking efficiency as final motor driving signal.

10 Claims, 4 Drawing Sheets

(56) References Cited

U.S. PATENT DOCUMENTS

| | | | | |
|---|---|---|---|---|
| 2003/0201975 A1* | 10/2003 | Bailey | ............... | G06F 3/016 345/161 |
| 2004/0233161 A1* | 11/2004 | Shahoian | ............ | G06F 3/016 345/156 |
| 2012/0188180 A1* | 7/2012 | Yang | ............ | G06F 3/016 345/173 |
| 2016/0058658 A1* | 3/2016 | Borras | ............ | H04W 68/005 601/46 |
| 2016/0070350 A1* | 3/2016 | Cruz-Hernandez | ..... | G06F 3/016 345/156 |

* cited by examiner

METHOD OF GENERATING MOTOR DRIVING SIGNAL, ELECTRONIC DEVICE AND STORAGE MEDIUM

TECHNICAL FIELD

The present disclosure relates to the technical field of electronic devices, and in particular, to a method of generating a motor driving signal for providing a tactile feedback, an electronic device, and a storage medium.

BACKGROUND

An electrical signal with a specially designed waveform can be used to drive a linear motor to achieve vibration required to meet a demanding tactile intensity within a specified time. Since a duration is short, usually from a few milliseconds to tens of milliseconds, an electrical signal of such a drive motor is also called a short signal. One short signal can be functionally divided into two segments. A first segment has a function of driving the motor to increase a vibration intensity from a zero level to a level required by the demanding tactile intensity within a possible shortest time; and a second segment has a function of driving the motor to decrease the vibration intensity from a peak level to the zero level within the possible shortest time. Therefore, the first segment of the short signal is called an acceleration segment, and the second segment of the short signal is called the braking segment.

In application scenarios such as a virtual Home button or some APP operations of a cellphone, the short signal can achieve a simple and concentrated tactile effect. Related research and experiments have shown that such application scenarios allow users to experience a simple, concentrated tactile effect, because the braking segment of the short signal will decrease the vibration intensity from the peak level to the zero level at high efficiency within a quite short time. Therefore, an efficient and rapid decrease of vibration intensity has become the only idea for the design of the braking segment of the short signal.

However, the inventors have found that at least the following problems exist in the prior art: a tactile experience test in application scenarios such as games and car's central control screens finds that the existing design of the braking segment of the short signal does not well provide the user with an expected low-frequency and heavy tactile effect.

BRIEF DESCRIPTION OF DRAWINGS

Many aspects of exemplary embodiment can be better understood with reference to following drawings. Components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

In order to make the purpose, technical solutions, and advantages of the embodiments of the present disclosure to be clearer, the technical solutions in the embodiments of the present disclosure are described in the following with reference to the accompanying drawings in the embodiments of the present disclosure. However, it should be understood by those skilled in the art that, in the various embodiments of the present disclosure, numerous technical details are set forth in order to provide the reader with a better illustration of the present disclosure. However, the technical solutions described in the present disclosure can also be implemented without these technical details and various changes and modifications based on the following embodiments.

Figure 1:
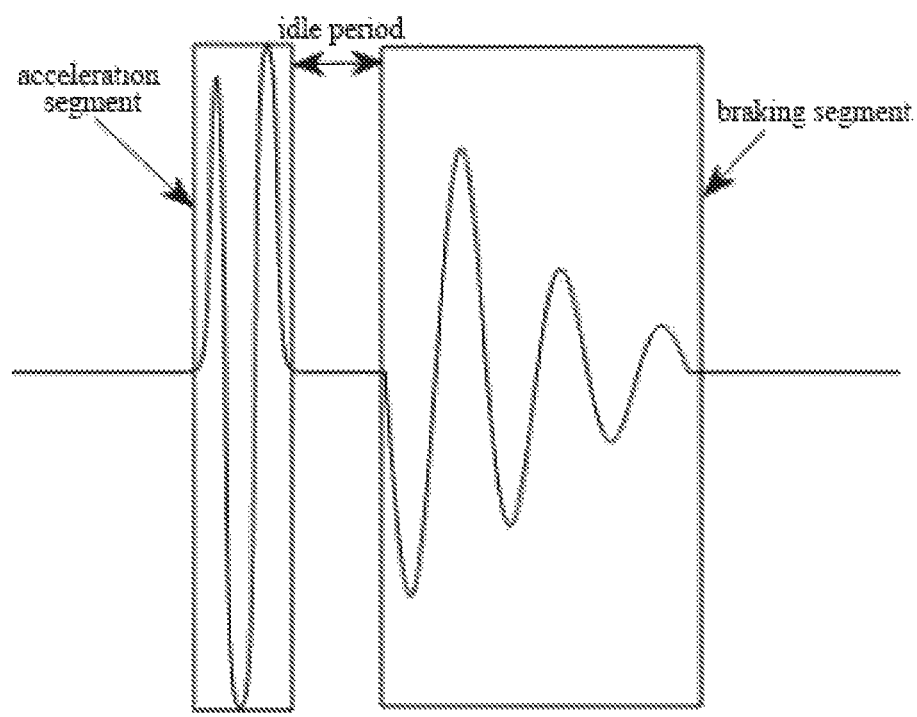
FIG. 1 is a schematic diagram of a motor braking signal according to the prior art.

The existing braking signal is shown in FIG. 1. Generally, a short signal capable of decreasing a vibration intensity of a motor efficiently and quickly is used, and the short signal includes: an acceleration segment signal for motor starting, an idle period without signal output, and a braking segment signal for motor braking. During the idle period, the motor is powered off, and then an original phase is reversed by a contactor by means of a point driving manner, that is, a reverse current is supplied to the motor to achieve braking. The inventors found in the tactile experience test such as control screens in games, automobiles and the like that when events such as shooting, door closing occur in the games, the user desires to feel a low-frequency and heavy tactile effect synchronously; when clicking on a large mass load such as a car's central control screen, the user prefers to feel the low-frequency and heavy tactile effect; and when performing some non-clicking operations, the user does not emphasize that a residual vibration intensity of the motor after the braking segment processing must be strictly equal to the zero level. However, the existing design of the braking segment of the short signal does not provide the user with an expected low-frequency and heavy tactile effect, and does not achieve a specific tactile effect in games, automobiles, and the like.

Therefore, in order to provide the user with a natural and realistic low-frequency and heavy tactile effect in the application scenarios related to games, automobiles and the like, the inventors broke through the existing ideas of designing the braking segment of the short signal, and replace the braking segment signal of the short signal with a low frequency driving signal composed of a constant segment signal and an attenuating segment signal. When the constant segment signal is used to drive the motor, since an amplitude of the attenuating segment signal remains the same, the motor continuously generates a low-frequency vibration feeling. When the attenuating segment signal is used to drive the motor, since the amplitude of the attenuating segment signal gradually decreases, the motor vibrates in a low frequency manner and a vibration amplitude gradually decreases until the motor stops vibrating, thereby achieving a low-frequency and heavy tactile effect.

A first embodiment of the present disclosure provides a method of generating a motor driving signal. A core concept of this embodiment of the present disclosure is to provide a method of generating a motor driving signal, which obtains an acceleration segment signal for driving the motor to start vibrating, a constant segment signal for achieving a low-frequency vibration tactile effect of the motor, and attenuating segment signal for decreasing a vibration quantity of the motor in a low frequency manner. Here, each of the frequency of the constant segment signal and the frequency of the attenuating segment signal is smaller than the frequency of the acceleration segment signal. The acceleration segment signal is spliced with the constant segment signal, and an idle period with no signal output is reserved between the braking segment and the constant segment, so that a first motor driving signal is obtained. A parameter of the constant segment signal of the first motor driving signal is adjusted according to a demand on vibration feeling, and the attenuating segment signal is spliced after the adjusted first motor driving signal, so that a second motor driving signal is obtained. A parameter of the attenuating segment signal of the second motor driving signal is adjusted to obtain the second motor driving signal with the highest braking efficiency, and the second motor driving signal with the highest braking efficiency is determined as a final motor driving signal.

In this embodiment of the present disclosure, a constant segment signal with a frequency smaller than the frequency of the acceleration segment signal is introduced after the acceleration segment signal, and an idle period with no signal output is reserved between the two, and an attenuating segment signal with a frequency smaller than the frequency of the acceleration segment signal is spliced after the constant segment signal, and then the parameters of the spliced signals are adjusted, so that the generated motor driving signal can drive the motor to start vibrating with the acceleration segment signal. The constant segment signal makes the motor continuously vibrate at a constant low frequency, so that the motor continuously generates a vibration feeling; and the attenuating segment signal makes the motor have a gradually decreased vibration quantity at a low frequency, so that the motor generates a low-frequency and heavy tactile effect. Therefore, with the constant segment signal and the attenuating segment signal after the idle period, the drive motor achieves a low-frequency and heavy tactile effect, which improves fidelity of a specific tactile effect in scenarios such as games and automobile's central control screens.

The details of implementation of the method of generating a motor driving signal of this embodiment will be described in the following. It should be noted that the following is merely for better illustrating the implementation details, and may not be a necessity for implementing the present solution.

Figure 2:
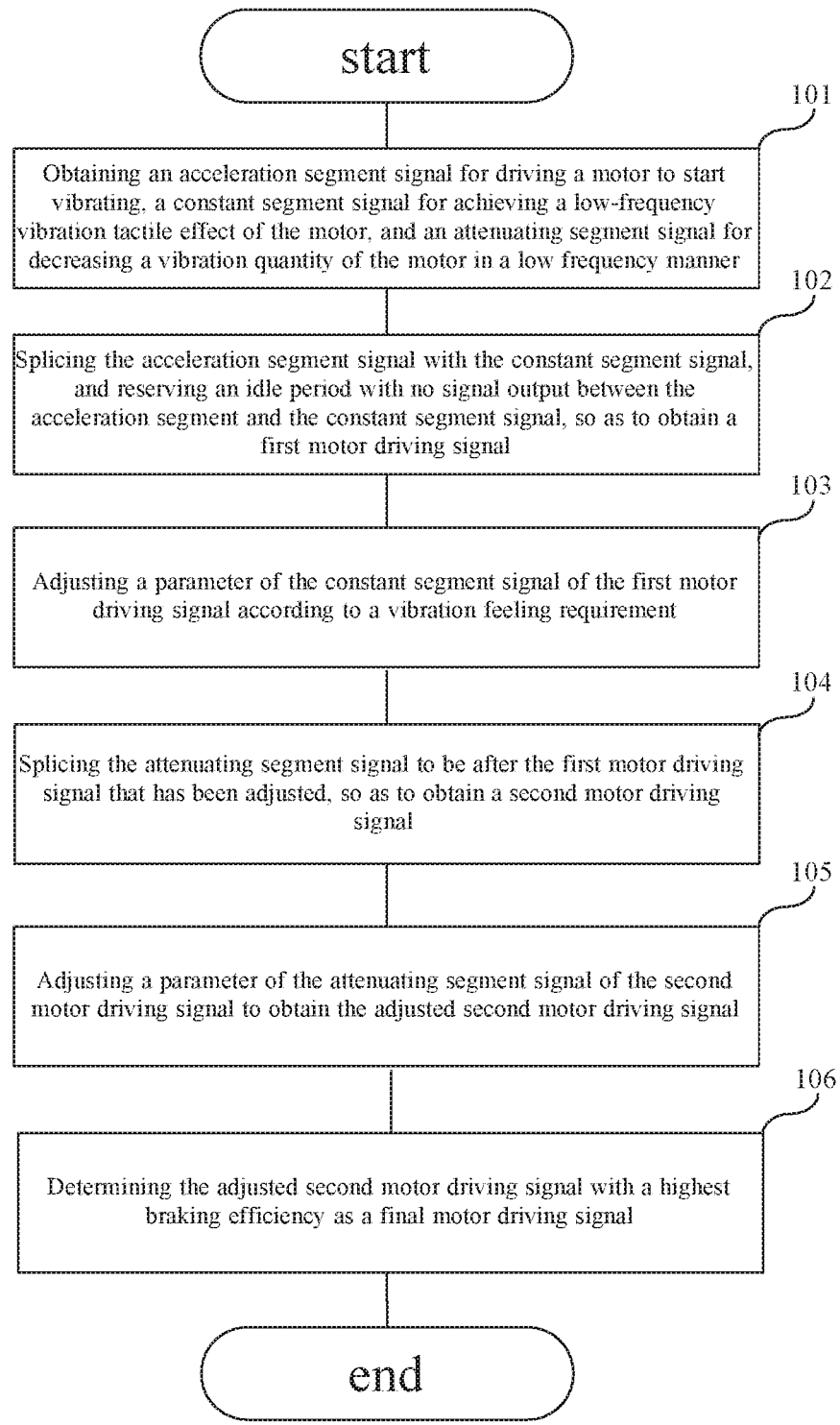
FIG. 2 is a schematic flow chart of a method of generating a motor driving signal according to a first embodiment of the present disclosure.

A detailed flow chart of the method of generating a motor driving signal in this embodiment is shown in FIG. 2.

At step 101, an acceleration segment signal for driving a motor to start vibrating, a constant segment signal for achieving a low-frequency vibration tactile effect of the motor, and an attenuating segment signal for decreasing a vibration quantity of the motor in a low frequency manner are obtained.

The so-called constant segment signal is a constant envelope signal (also called a constant segment envelope signal), and is configured to make the motor continuously vibrate at a constant low frequency, so that the motor continuously generates a vibration feeling. The so-called attenuating segment signal is a gradually attenuated envelope signal (also called the enveloped attenuating segment signal), and is configured to make the motor to gradually decrease the vibration quantity in a low frequency manner, so that the motor generates a low frequency tactile effect. Using signals of different frequencies, the linear motor can be driven to provide the user with different low-frequency tactile feelings. In this embodiment, the frequency of the constant segment envelope signal and the frequency of the attenuating segment envelope signal are each smaller than 120 Hz, so as to drive the motor to achieve a low-frequency vibration effect. It should be appreciated that, the frequency of the attenuating segment envelope signal and the frequency of the constant segment envelope signal may be the same, or may be different according to different users' requirements on low-frequency tactile feeling.

At step 102, the acceleration segment signal is spliced with the constant segment signal, and an idle period with no signal output is reserved between the acceleration segment and the constant segment to obtain a first motor driving signal.

At step 103, a parameter of the constant segment signal of the first motor driving signal is adjusted according to a vibration feeling requirement.

The step 103 includes: obtaining a preset vibration duration and a preset vibration intensity according to the vibration feeling requirement; determining the preset vibration duration as a duration of the constant segment signal, and determining the preset vibration intensity as an amplitude of the constant segment signal.

In this embodiment, the so-called vibration feeling requirement refers to the user's requirement on a duration and a vibration intensity of a low-frequency vibration in a specific scenario. In different scenarios (for example, in a case of simulating a gun shooting and a collision), the user's vibration feeling requirement may be various, and the user's requirement on the duration and vibration intensity of the low-frequency vibration may be various. Therefore, in practice, the user can preset corresponding preset vibration durations and preset vibration intensities in different scenarios. The so-called preset vibration duration can be set according to different users' requirements on the low-frequency vibration duration, and the so-called preset vibration intensity can be set according to different users' requirements on the low-frequency vibration intensity. In the method provided by this embodiment, when adjusting the parameter of the first motor driving signal, the preset vibration duration and the preset vibration intensity in this scenario are directly obtained, and then the preset vibration duration is determined as the duration of the constant segment envelope signal, and the preset vibration intensity is determined as the amplitude of the constant segment envelope signal, so as to meet individual requirements of the user.

Optionally, in this embodiment, the duration of the constant segment signal can be determined according to the preset vibration duration, and the amplitude of the constant segment signal can be determined according to the preset vibration intensity, and then the constant segment envelope signal with the determined parameters are spliced with the acceleration segment signal.

In addition, in this embodiment, the constant segment envelope signal is a sinusoidal signal with a constant frequency. Since the acceleration segment signal has a signal value of zero at the end, and there is no signal output in the idle segment, if the constant segment envelope signal is not a sinusoidal signal, an abrupt change in waveform signal will occur from the acceleration segment signal to the constant segment envelope signal. As a result, the vibration tactile feeling of the low-frequency signal will be influenced. The constant segment envelope signal is expressed by a formula (1) as follows.

$$S\_constant(t) = A\_constant * \sin(2 * PI * Fc * t) \quad (1)$$

Here, a time variable t ranges from 0 to T_constant, where T_constant is the duration of the constant segment envelope signal. A_constant is the amplitude of the constant segment envelope signal. PI is the circular constant. Fc is a frequency of the sinusoidal signal.

It should be noted that, in this embodiment, the duration of the constant segment envelope signal is equal to an integer multiple of a half period of the constant segment envelope signal, that is, T_constant is an integer multiple of the half period of the sinusoidal signal, thereby further preventing the waveform from being abruptly changed.

At step 104, a second motor driving signal is obtained after splicing the attenuating segment signal with the adjusted first motor driving signal.

At step 105, a parameter of the attenuating segment signal of the second motor driving signal is adjusted to obtain a second motor driving signal with the highest braking efficiency. In this embodiment, the motor driving signal with the highest braking efficiency refers to the motor driving signal that provides a tactile effect that best meets the user's expectation.

At step 106, the second motor driving signal with the highest braking efficiency is determined as a final motor driving signal.

It should be noted that the "the parameter of the attenuating segment signal of the second motor driving signal" in step 105 refers to a duration, an attenuation intensity, or an initial amplitude of the attenuating segment envelope signal. The adjustment in this embodiment means that at least one of the duration, the attenuation intensity and the initial amplitude of the attenuating segment envelope signal is changed to form a plurality of different attenuating segment envelope signals.

Correspondingly, step 106 specifically includes: changing at least one of the duration, the attenuation intensity and the initial amplitude of the attenuating segment envelope signal to form a plurality of different attenuating segment envelope signals; obtaining a braking efficiency of the second motor driving signal with the plurality of different attenuating segment envelope signals; and determining the second motor driving signal with the highest braking efficiency as the final motor driving signal.

In the specific implementation of steps 105 and 106, the attenuating segment envelope signal may be expressed by a formula (2) as follows.

$$S\_decay(t) = A\_decay * \exp(-C\_decay * t) * \sin(2 * PI * Fc * t) \quad (2)$$

Here, a time variable t ranges from 0 to T_decay, where T_decay is the duration of the attenuating segment envelope signal. A_decay is the initial amplitude of the attenuating segment envelope signal. C_decay is the attenuation intensity of the attenuating segment envelope signal. First, by changing at least one of T_decay, A_decay, and C_decay, a plurality of different attenuating segment envelope signals is formed. Then, the motor continuously vibrates at a constant low frequency due to the constant segment signal, so that the motor continuously generates a vibration feeling; the attenuating segment signal makes the motor to gradually decrease the vibration quantity in a low frequency manner, so that the motor generates a low-frequency and heavy tactile effect. Therefore, the plurality of different attenuating segment envelope signals is respectively inputted into the motor to obtain the braking efficiencies, and then the attenuating segment envelope signal with the highest braking efficiency replaces the initial attenuating segment envelope signal of the second motor driving signal, so that the motor driving signal of the attenuating segment envelope signal with the highest braking efficiency is used as the final motor driving signal.

In this embodiment, the braking efficiency is a ratio of the motor brake starting speed to a duration used.

It should be noted that different users have different perceptions of a residual vibration intensity when the motor approaches the end of the vibration. Therefore, when obtaining the braking efficiencies of the plurality of different attenuating segment envelope signals, a condition for determining a completion of the motor brake is not limited to a condition in which the motor is absolutely stationary. The motor vibration intensity value that the user cannot perceive and can be ignored may also be used as a mark for determining the completion of the motor brake.

Here, in this embodiment, the motor vibration intensity value that the user cannot perceive and can be ignored is defined as a motor residual vibration intensity Gres. When the residual vibration intensity of the motor during the braking process is Gres, the vibration intensity is so weak that the user cannot perceive, and this moment can be considered as the completion of the motor brake. The residual vibration intensity Gres of the motor can be determined by collecting and analyzing the feeling data of a large number of users, or can be set by the user. Then on basis of this, motor braking efficiencies are calculated by the obtained plurality of different attenuation segment envelope signals respectively inputting into the motor, so that the calculated braking efficiency is more realistic. It is appreciated that, the user can also set the residual vibration intensity Gres of the motor according to his subjective experience and sensitivity. If the user is not sensitive to the residual vibration intensity, then Gres can be set as a large value, otherwise, Gres should be set as a small value.

Further, in this embodiment, the duration of the attenuating segment envelope signal is an integer multiple of the duration of the constant segment envelope signal with the constant frequency. Therefore, no abrupt change in waveform occurs from the constant segment envelope signal to the attenuating segment envelope signal, and thus it does not cause any drastic change in the driving signal, thereby improving the user's tactile experience.

Compared with the prior art, in this embodiment of the present disclosure, a constant segment signal with a frequency smaller than the frequency of the acceleration segment signal is introduced after the acceleration segment signal, and an idle period with no signal output is reserved between the two, and an attenuating segment signal with a frequency smaller than the frequency of the acceleration segment signal is spliced after the constant segment signal, and then the parameters of the spliced signals are adjusted, so that the generated motor driving signal can drive the motor to start vibrating with the acceleration segment signal. The constant segment signal makes the motor continuously vibrate at a constant low frequency, so that the motor continuously generates a vibration feeling; and the attenuating segment signal makes the motor have a gradually decreased vibration quantity at a low frequency, so that the motor generates a low-frequency and heavy tactile effect. Therefore, with the constant segment signal and the attenuating segment signal after the idle period, the drive motor achieves a low-frequency and heavy tactile effect, which improves fidelity of a specific tactile effect in scenarios such as games and automobile's central control screens.

A second embodiment of the present disclosure relates to a method of generating a motor driving signal. The second embodiment is an improvement of the first embodiment, and a main improvement is that a duration of the idle period is adjusted so that the vibration quantity of the motor when inputting the constant segment signal is smaller than the vibration quantity of the motor when inputting the acceleration segment signal. In this way, it further improves fidelity of a specific tactile effect in scenarios such as games and automobiles.

Figure 3:
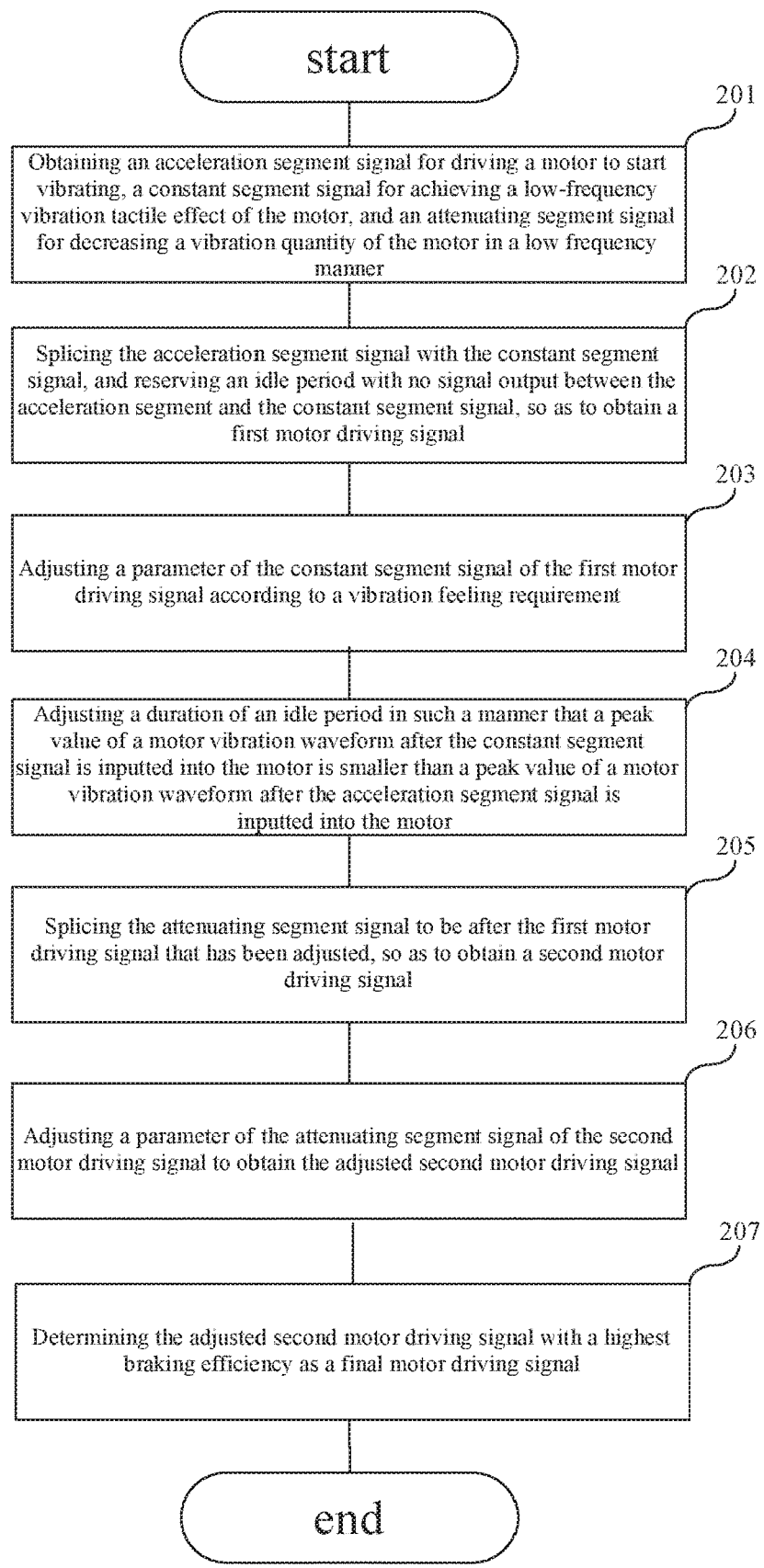
FIG. 3 is a schematic flow chart of a method of generating a motor driving signal according to a second embodiment of the present disclosure.

A detailed flow chart of the method of generating a motor driving signal in this embodiment is shown in FIG. 3. The method includes following steps.

At step 201, an acceleration segment signal for driving a motor to start vibrating, a constant segment signal for achieving a low-frequency vibration tactile effect of the motor, and an attenuating segment signal for decreasing a vibration quantity of the motor in a low frequency manner are obtained.

At step 202, the acceleration segment signal is spliced with the constant segment signal, and an idle period with no signal output is reserved between the acceleration segment and the constant segment to obtain a first motor driving signal.

At step 203, a parameter of the constant segment signal of the first motor driving signal is adjusted according to a vibration feeling requirement.

The steps 201 to 203 described above are substantially the same as the steps 101 to 103 in the first embodiment, and will not be further described herein.

At step 204, a duration of the idle period is adjusted, so that a peak value of a motor vibration waveform after the constant segment signal is inputted into the motor is smaller than a peak value of a motor vibration waveform after the acceleration segment signal is inputted into the motor.

After adjusting the parameter of the constant segment signal of the first motor driving signal according to the vibration feeling requirement, before splicing the attenuating segment signal with the adjusted first motor driving signal, the method further includes: adjusting the duration of the idle period, so that the peak value M2 of the motor vibration waveform after the constant segment signal is inputted into the motor is smaller than the peak value M1 of the motor vibration waveform after the acceleration segment signal is inputted into the motor. In this solution, by adjusting the duration of the idle period, the vibration quantity of the motor when inputting the constant segment envelope signal is smaller than the vibration quantity of the motor when inputting the acceleration segment signal, thereby further improving fidelity of a specific tactile effect in scenarios such as games and automobile's central control screens.

At step 205, a second motor driving signal is obtained after splicing the attenuating segment signal with the adjusted first motor driving signal.

At step 206, a parameter of the attenuating segment signal of the second motor driving signal is adjusted to obtain a second motor driving signal with the highest braking efficiency.

At step 207, the second motor driving signal with the highest braking efficiency is determined as a final motor driving signal.

The steps 204 to 207 described above are substantially the same as the steps 103 to 106 in the first embodiment, and will not be further described herein.

Compared with the prior art, this embodiment of the present disclosure provides a motor driving method. After adjusting the parameter of the first motor driving signal according to the vibration feeling requirement, before splicing the attenuating segment signal with the adjusted first motor driving signal, the method further includes: adjusting the duration of the idle period, so that the peak value of the motor vibration waveform after the constant segment signal is inputted into the motor is smaller than the peak value of the motor vibration waveform after the acceleration segment signal is inputted into the motor. By adjusting the duration of the idle period, the vibration quantity of the motor when inputting the constant segment envelope signal is smaller than the vibration quantity of the motor when inputting the acceleration segment signal, thereby further improving fidelity of a specific tactile effect in scenarios such as games and automobile's central control screens.

The steps of each method described above are merely for the sake of clear description, and the steps may also be combined into one step or a certain step may also be divided into multiple steps during implementation. As long as the same logic relation is conformed, it is within the protection scope of the present disclosure. Providing an insignificant modification to an algorithm or process or introducing an insignificant design without changing a core design of the algorithm and processes will fall into the scope of the present disclosure.

Figure 4:
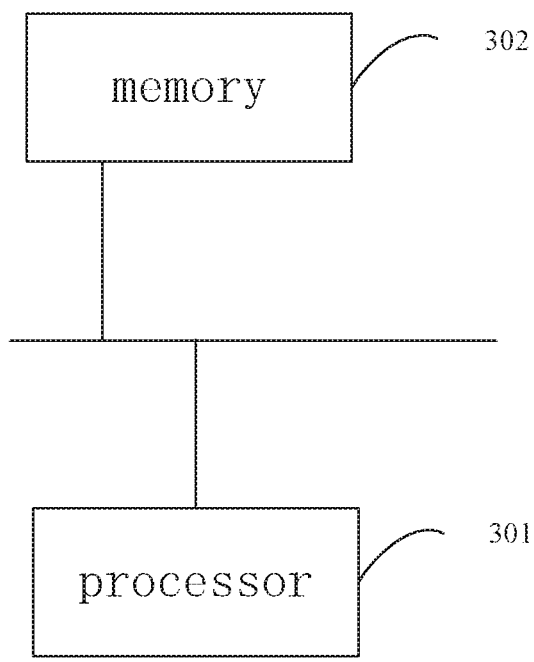
FIG. 4 is a schematic structural diagram of an electronic device according to a third embodiment of the present disclosure.

A third embodiment of the present disclosure relates to an electronic device, as shown in FIG. 4, the electronic device includes at least one processor 301, and a memory 302 communicated to the at least one processor 301. The memory 302 stores instructions executable by the at least one processor 301, and the instructions are executed by the at least one processor 301, so that the at least one processor 301 can perform the method of generating a motor driving signal described above.

The memory 302 and the processor 301 are connected by a bus, and the bus may include any number of interconnected buses and bridges. The bus connects various circuits of one or more processors and the memory 302 together. The bus can also connect various other circuits such as peripherals, voltage regulators, and power management circuits, which are well known in the related art and, therefore, will not be further described herein. A bus interface provides an interface between the bus and the transceiver. The transceiver may be one element or a plurality of elements, such as multiple receivers and transmitters, providing units for communicating with various other devices on a transmission medium. Data processed by the processor is transmitted in the wireless medium via an antenna. Further, the antenna can also receive the data and transmit the data to the processor 301.

The processor 301 is responsible for managing the bus and normal processing, and can also provide various functions including timing, peripheral interfaces, voltage regulation, power management, and other control functions. The memory 302 can be used to store data used by the processor when performing operations.

An embodiment of the present disclosure further provides a computer readable storage medium storing a computer program that is executed by a processor to implement the above-described method of generating a motor driving signal.

It should be understood by those skilled in the art that all or part of the steps of the above-mentioned embodiments may be implemented by a program instructing a related hardware. The program is stored in a storage medium, and includes a plurality of instructions for making a device (such as a microcontroller, a chip) or processor execute all or part of the steps of the method described in various embodiments of the present disclosure. The above-mentioned storage medium includes any medium that can store programming codes, such as a U disk, a mobile hard disk, a read-only memory (ROM), a random access memory (RAM), a diskette or an optical disk.

It should be understood by those skilled in the art that the above embodiments are merely some specific embodiments of the present disclosure, and various changes in form and details may be made without departing from the scope of the present disclosure.

What is claimed is:

1. A method of generating a motor driving signal, comprising steps of:
   obtaining an acceleration segment signal for driving a motor to start vibrating, a constant segment signal for achieving a low-frequency vibration tactile effect of the motor, and an attenuating segment signal for decreasing a vibration quantity of the motor in a low frequency manner, both a frequency of the constant segment signal and a frequency of the attenuating segment signal being smaller than a frequency of the acceleration segment signal;
   splicing the acceleration segment signal with the constant segment signal, and reserving an idle period with no signal output between the acceleration segment signal and the constant segment signal, so as to obtain a first motor driving signal;
   adjusting a parameter of the constant segment signal of the first motor driving signal according to a vibration feeling requirement, and splicing the attenuating segment signal to be after the first motor driving signal that has been adjusted, so as to obtain a second motor driving signal; and
   adjusting a parameter of the attenuating segment signal of the second motor driving signal to obtain the adjusted second motor driving signal, and determining the adjusted second motor driving signal with a highest braking efficiency as a final motor driving signal.

2. The method of generating a motor driving signal as described in claim 1, wherein the step of adjusting the parameter of the constant segment signal of the first motor driving signal according to the vibration feeling requirement comprises:
   obtaining a preset vibration duration and a preset vibration intensity according to the vibration feeling requirement; and
   determining the preset vibration duration as a duration of the constant segment signal, and determining the preset vibration intensity as an amplitude of the constant segment signal.

3. The method of generating a motor driving signal as described in claim 2, wherein the constant segment signal is a sinusoidal signal with a constant frequency.

4. The method of generating a motor driving signal as described in claim 3, wherein a duration of the constant segment signal is an integer multiple of a half of a period of the constant segment signal.

5. The method of generating a motor driving signal as described in claim 1, further comprising, after said adjusting the parameter of the constant segment signal of the first motor driving signal according to the vibration feeling requirement and prior to said splicing the attenuating segment signal to be after the first motor driving signal that has been adjusted:
   adjusting a duration of the idle period in such a manner that a peak value of a motor vibration waveform after the constant segment signal is input into the motor is smaller than a peak value of a motor vibration waveform after the acceleration segment signal is input into the motor.

6. The method of generating a motor driving signal as described in claim 1, wherein the step of adjusting the parameter of the attenuating segment signal of the second motor driving signal to obtain the adjusted second motor driving signal, and determining the adjusted second motor driving signal with the highest braking efficiency as the final motor driving signal comprises:
   changing at least one of a duration, an attenuation intensity, and an initial amplitude of the attenuating segment signal to form a plurality of different attenuating segment signals;
   obtaining braking efficiencies of second motor driving signals with the plurality of different attenuating segment signals; and
   determining the adjusted second motor driving signal having the highest braking efficiency as the final motor driving signal.

7. The method of generating a motor driving signal as described in claim 6, wherein the frequency of the constant segment signal is constant; and the duration of the attenuating segment signal is an integer multiple of a half of a period of the constant segment signal.

8. The method of generating a motor driving signal according to claim 1, wherein the frequency of the constant segment signal and the frequency of the attenuating segment signal are each smaller than 120 Hz.

9. An electronic device, comprising:
   at least one processor; and
   a memory communicatively connected to the at least one processor;
   wherein the memory stores instructions executable by the at least one processor, the instructions, when being executed by the at least one processor, cause the at least one processor to perform the method of generating a motor driving signal as described in claim 1.

10. A non-transient storage medium storing a computer program, wherein when being executed, the computer program causes to implement the method of generating a motor driving signal as described in claim 1.

* * * * *